Figure 1:
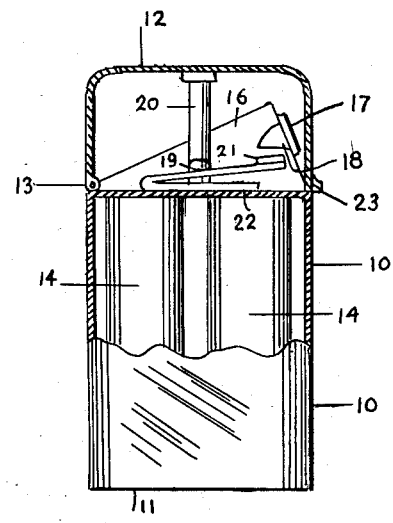

April 20, 1954    A. R. TOOKER, JR    2,676,237
AUTOMATIC ELECTRIC LIGHTER FOR CIGARETTES
Filed Nov. 28, 1951

Inventor

Patented Apr. 20, 1954

2,676,237

UNITED STATES PATENT OFFICE 2,676,237

AUTOMATIC ELECTRIC LIGHTER FOR CIGARETTES

Albert R. Tooker, Jr., Valentine, Nebr.

Application November 28, 1951, Serial No. 258,728

1 Claim. (Cl. 219—32)

The present invention relates to an automatic electric lighter for cigarettes and it consists in the combinations, constructions and arrangements of parts herein described and claimed.

Generally there is provided a cigarette lighter including a casing of metal wherein is mounted a pair of dry cells and which casing is provided with a cover hinged thereto and provided with a latch for maintaining the same normally in closed position. Extending upwardly from either side of the casing and adapted to be encompassed by the cover is a pair of spaced walls of dielectric material between which is mounted a plunger adapted to be moved downwardly by the closing of the cover and the lower end of which plunger is adapted to bear against a spring one end of which is in constant contact with the dry cell batteries and the other end of which is adapted to contact a fixed contact member when the cover is opened and the plunger no longer bears thereagainst. The contact between the spring and permanent contact member completes an electrical circuit including the casing, the dry cell batteries, the spring, the fixed contact member and an electrical heating unit forming a part of the invention.

It is accordingly an object of the invention to provide a novel cigarette lighter wholly powered by electrical means.

Another object of the invention is the provision, in a device of the character set forth, of novel switch means forming a part of the invention.

Another object of the invention is to provide a device of the character set forth which is simple in construction, inexpensive to manufacture and yet effective and efficient in use.

Figure 2:
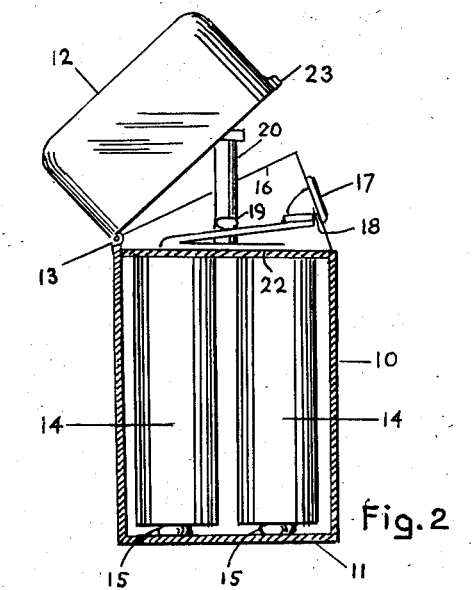

Other and further objects of the invention will become apparent from a reading of the following specification taken in conjunction with the drawing, in which:

Figure 1 is a side elevational view, partly broken away, of an embodiment of the invention shown in closed condition, Figure 2 is a view similar to Figure 1 but showing the same in opened condition.

Referring more particularly to the drawing, there is shown therein an automatic electric lighter for cigarettes comprising a casing 10 formed of metal and having a bottom 11 and a cover 12 hinged thereto, as indicated at 13.

A pair of dry cell batteries 14 which are each provided with the conventional side covers of dielectric material such as cardboard or the like, is mounted in inverted position in the casing 10 with their central electrodes 15 in contact with the bottom 11. Extending upwardly from the upper sides of the casing 10 and adapted to be encompassed by the cover 12 when the same is in closed position, is a pair of spaced upwardly extending plates 16 formed of dielectric material such as fiberboard or the like and which plates have interconnecting their forward edges a heating element 17 provided upon its rearward side with a contact member 18. Vertically slidable in a cross piece 19 which interconnects the plates 16 is a plunger 20 formed of dielectric material and whose upper end is adapted to bear against the underside of the cover 12 and whose lower end bears against a spring contact member 21 provided with a foot portion 22 which is in contact with the bases of the dry cells 14.

In operation, it will be apparent that when the cover 12 is released by means of a latch member 23, that the plunger 20 which has heretofore been holding the spring contact member 21 out of engagement with the permanent contact 18, will be freed and allow the spring member 21 to come into contact with the contact member 18 thus completing an electrical circuit which includes the contact members 18 and 21, the batteries 14, the casing 10 and the heating element 17 which is grounded to the casing 10 thus allowing the heating element to become heated sufficiently to allow the lighting of a cigarette whose end may be placed thereagainst.

While but one form of the invention has been shown and described herein, it will be readily apparent to those skilled in the art that many minor modifications may be made without departing from the spirit of the invention or the scope of the appended claim.

What is claimed is:

A portable electrical lighter for cigarettes and the like comprising a casing of metal having dry cell batteries disposed and mounted therein, a hingedly connected cover for said casing, said batteries disposed in an inverted position within said casing and having their central electrodes in contact with the bottom of said casing, a heating element held between two spaced apart members of dielectric material and positioned immediately beneath said cover, a switch means positioned in close proximity to said heating element and having connection with said batteries, means for maintaining said switch in an open position when said cover is closed, means for closing said switch when said cover is opened, said switch closing means including an upright plunger of dielectric material having its upper end positioned to bear against the inside of the said cover and its lower end to contact said switch means said switch being in the form of a spring doubled on itself in a horizontal plane, said switch having a base in contact with the outer portion of the said dry cells, said plunger adapted to hold said switch in an open position when said cover is closed, and said plunger permitting said switch to make contact with the said heating element to close an electric circuit when the said cover is opened.

References Cited in the file of this patent

UNITED STATES PATENTS

| Number | Name | Date |
|---|---|---|
| Re. 23,435 | Bakst et al. | Dec. 4, 1951 |
| 761,372 | Gill | May 31, 1904 |
| 1,542,752 | Williams et al. | June 16, 1925 |
| 1,610,135 | Kelsey | Dec. 7, 1926 |
| 1,721,203 | Bucknell et al. | July 16, 1929 |
| 1,728,292 | Lavick | Sept. 17, 1929 |
| 2,525,040 | Luthi | Oct. 10, 1950 |
| 2,535,665 | Boyarsky et al. | Dec. 26, 1950 |